Patented Dec. 19, 1933

1,940,053

UNITED STATES PATENT OFFICE 1,940,053

YELLOW AND ORANGE COLORED VULCANIZATE

Winfrid Hentrich, Erlangen, Max Hardtmann, Naunhof, near Leipzig, and Peter Backes, Rheydt, Germany, assignors to General Aniline Works, Inc., New York, N. Y., a corporation of Delaware No Drawing. Application March 13, 1931, Serial No. 522,514, and in Germany March 14, 1930

5 Claims. (Cl. 18—50)

The present invention relates to new yellow to orange colored vulcanizates derived from natural rubber or artificial rubber-like masses.

It is required of colored rubber masses that the coloring constituent should not be altered by vulcanization and should not bleed, that is to say, should not be capable of casting out into differently colored or uncolored rubber masses worked up with the rubber in question. In addition the dyeing should be fast to light and soap. Yellow to yellowish-red shades and mixed shades, which completely fulfilled these requirements have not hitherto been available by the use of organic dyestuffs.

In accordance with the present invention the earth alkali metal salts of sulfonated azodyestuffs from nitranilines or substitution products thereof and aceto-acetic acid arylides are applied in the manufacture of colored rubber masses as the coloring constituents, either alone or together with other coloring materials. The sodium salts of the sulfonated azo dyestuffs in question are described in U. S. Patent 1,086,155. They are transformed into the earth alkali metal salts according to the usual methods, for example, by adding an earth alkali metal chloride to the aqueous solution of the alkali metal salts. These compounds fulfill to a far reaching extent the above requirements. The sulfonic acid groups can be present either in the diazo component or in the coupling component. The coloring matters in question may be incorporated within the vulcanization mixtures according to customary methods, for example, by rolling or kneading, whereafter the mixture may be vulcanized in the usual manner.

The following examples illustrate our invention without, however, limiting it thereto:—

Example 1.—For the manufacture of a yellow colored floating quality of rubber, a mixture of the following composition is vulcanized for 15 minutes at 2 atmospheres (super-atmospheric):—

100.0 parts by weight of light crepe
2.5 parts by weight of sulfur
3.0 parts by weight of zinc oxide
3.0 parts by weight of titanium dioxide
0.35 part by weight of tetramethylthiuram disulfide
2.0 parts by weight of the calcium salt of the azo dyestuff from 5-nitro-2-aminobenzoic acid and aceto-acetic-acid-2-anisidide-sulfonic acid.

Example 2.—For the manufacture of a golden yellow rubber mass for rubber mats the following mixture is vulcanized for 15 minutes under 3½ atmospheres pressure (superatmospheric):—

100.0 parts by weight of light crepe
150.0 parts by weight of chalk
50.0 parts by weight of kaolin
4.0 parts by weight of mineral oil
5.0 parts by weight of zinc oxide
1.5 parts by weight of stearic acid
3.0 parts by weight of sulfur
1.0 part by weight of mercapto benzothiazole
0.3 part by weight of hexamethylenetetramine and
2.0 parts by weight of the strontium salt of the sulfonated dyestuff from 5-nitro-2-aminobenzoic acid and aceto-acetic-acid-2-anisidide. The golden yellow mass thus obtained possesses very satisfactory fastness to light. White rubber worked up with the same is not colored by bleeding and the fastness to washing is likewise satisfactory.

By using the calcium salt instead of the strontium salt a more greenish shade is obtained, by the use of the barium salt a more reddish shade results. By the addition of a blue dyestuff green dyeings are obtained.

Example 3.—For the manufacture of a yellow colored floating quality of rubber a vulcanization mixture is applied as described in Example 1, but containing instead of the dyestuff therein described the calcium salt of the azodyestuff from 2-nitro-1-aminobenzene-4-sulfonic acid and aceto-acetic-acid-2-anisidide. By employing instead of the calcium salt the corresponding barium salt a more reddish colored vulcanizate is obtained.

Example 4.—For the manufacture of a yellow rubber mass for rubber mats a vulcanization mixture is applied as described in Example 2, employing as dyestuff the calcium salt of the azodyestuff from 2-nitro-1-aminobenzene-4-sulfonic acid and aceto-acetic-acid-2-chloroanilide. A somewhat more reddish shade is obtained by employing instead of the calcium salt of the dyestuff mentioned the corresponding barium salt.

Example 5.—A particularly greenish-yellow rubber mass is obtained according to the directions of Example 1, by substituting the dyestuff there mentioned by the azodyestuff from 2-nitro-1-aminobenzene-4-sulfonic acid and aceto-acetic acid anilide.

Example 6.—A yellow orange colored rubber mass for rubber mats is obtained according to the directions of Example 2, by replacing the dyestuff there mentioned by the barium salt of the azodyestuff from 4-nitro-1-aminobenzene-2-sulfonic acid and aceto acetic acid-2-anisidide.

Instead of the earth alkali metal salts mentioned in the above examples, the earth alkali metal salts of the azodyestuff from 5-nitro-2-aminobenzoic acid and aceto acetic acid-beta-naphthylamide, sulfonated by means of fuming sulfuric acid (10%) at about 10–20° C., may be applied. Likewise, the natural rubber mentioned in the examples, may be replaced by artificial rubber-like masses, as they are obtainable, for example, by polymerization of butadiene hydrocarbons or other polymerizable compounds.

It may be mentioned that the term "rubber" used in the annexed claims, is intended to include natural rubber as well as artificial rubber-like masses of the type above referred to.

We claim:—

1. Vulcanized rubber comprising an earth alkali metal salt of a sulfonated azo dyestuff obtainable from a nitroaniline and an aceto acetic acid arylide, said salts being incorporated within the rubber before vulcanization.

2. Vulcanized rubber comprising an earth alkali metal salt of a compound selected from the group consisting of the azo dyestuffs obtainable from 5-nitro-2-aminobenzoic acid and aceto acetic acid-2-anisidide sulfonic acid, 2-nitro-1-aminobenzene-4-sulfonic acid with aceto acetic acid-2-anisidide, and 2-nitro-1-aminobenzene-4-sulfonic acid and aceto acetic acid-2-chloroanilide, said salts being incorporated within the rubber before vulcanization.

3. Vulcanized rubber comprising the calcium salt of the azo dyestuff obtainable from 5-nitro-2-aminobenzoic acid and aceto acetic acid-2-anisidide sulfonic acid, said salts being incorporated within the rubber before vulcanization.

4. Vulcanized rubber comprising an earth alkali metal salt of the azo dyestuff obtainable from 2-nitro-1-aminobenzene-4-sulfonic acid and aceto acetic acid-2-anisidide, said salts being incorporated within the rubber before vulcanization.

5. Vulcanized rubber comprising an earth alkali metal salt of the azo dyestuff obtainable from 2-nitro-1-aminobenzene-4-sulfonic acid and aceto-acetic acid-2-chloroanilide, said salts being incorporated within the rubber before vulcanization.

WINFRID HENTRICH.
MAX HARDTMANN.
PETER BACKES.